UNITED STATES PATENT OFFICE.

EDWARD WILLIAM PARNELL AND JAMES SIMPSON, OF LIVERPOOL, COUNTY OF LANCASTER, ENGLAND.

OBTAINING HYDROGEN SULPHIDE.

SPECIFICATION forming part of Letters Patent No. 394,387, dated December 11, 1888.

Application filed February 9, 1888. Serial No. 263,449. (No model.) Patented in England December 31, 1887, No. 17,970.

*To all whom it may concern:*

Be it known that we, EDWARD WILLIAM PARNELL and JAMES SIMPSON, of Liverpool, in the county of Lancaster, England, have invented a new and useful Improvement in Obtaining Sulphureted Hydrogen, (for which we have obtained Letters Patent in England, dated December 31, 1887, No. 17,970;) and we do hereby declare the following to be a full, clear, and exact description thereof.

The invention relates to the elimination of sulphureted hydrogen from a solution of sulphide of ammonium by means of carbonic-acid gas.

Hitherto when it has been desired to obtain sulphureted hydrogen practically pure or containing only a small admixture of diluting-gases it has been necessary to use carbonic-acid gas free from admixture with other gases, so that the direct use of dilute carbonic acid obtained from a limekiln or from products of combustion was excluded and the cost of obtaining practically pure sulphureted hydrogen was necessarily high.

Now, the object of our invention is to provide a process by which in the treatment of a solution of sulphide of ammonium dilute carbonic acid, such as that above mentioned, may be used alone or in conjunction with pure or nearly pure carbonic-acid gas to obtain undiluted or nearly pure sulphureted hydrogen. The cost of obtaining strong sulphureted hydrogen is thereby considerably reduced.

The invention consists, essentially, in the treatment in two stages or in two operations of sulphide of ammonium in solution by carbonic-acid gas—that is to say, sulphide of ammonium is first subjected to the action of dilute carbonic-acid gas until sulphureted hydrogen begins to be given off the evolved gases, which at this stage of the operation consists, mainly, of nitrogen mixed with a little carbonic acid and sulphureted hydrogen, being allowed to escape. The partially-carbonated sulphide of ammonium is then, secondly, subjected to the further action of dilute carbonic-acid gas, (or when practically pure sulphureted hydrogen is required to the action of pure carbonic-acid gas,) when a supercarbonate of ammonia will be formed in solution and sulphureted hydrogen will be evolved. The latter is collected for use as required.

As during the first part of the above treatment the gases evolved usually contain a small percentage of sulphureted hydrogen, it is advisable to pass the said gases through an oxide-of-iron purifier or through damp sulphide of calcium, so that the said sulphureted hydrogen may be absorbed before the gases are allowed to escape into the atmosphere.

The above operations are advantageously carried on in two vessels, the first of which is open to the atmosphere, either direct or through the purifiers above mentioned, and the second of which is connected with a gas-holder or other receptacle for sulphureted hydrogen; or one vessel may be made with connections which can be opened either to the atmosphere or to the gas-holder, as required.

It is manifest that by the preliminary treatment of sulphide of ammonium, as above set forth, by dilute carbonic-acid gas a considerable amount or carbonic acid is absorbed and a large porportion of the inert gases with which the carbonic-acid gas was diluted passes away into the atmosphere. By this means the percentage of sulphureted hydrogen in the gases evolved during the second part of the process when only dilute carbonic-acid gas is used is materially increased. When practically pure sulphureted hydrogen is required, the cost of pure carbonic acid is reduced to that necessary merely for supplying such acid during the second part of the process.

This process is available for the treatment of any solution of sulphide of ammonium for the purpose of obtaining sulphureted hydrogen and carbonate of ammonia. The sulphide of ammonium may be made in quantity by the action of sulphide of calcium on ammonia, or it may be obtained in other ways.

In the manufacture of alkali by the process patented by us, No. 343,673, strong carbonic acid for the final treatment of the sulphide of ammonium may be obtained, that process consisting, briefly stated, in the conversion of crude bicarbonate of soda into monocarbonate of soda. This strong carbonic acid may be used to advantage in the final treatment, above set forth, by itself or mixed with weaker gas, or strong carbonic acid from other convenient source may be used.

What I claim as my invention, and desire to secure by Letters Patent, is—

1. The herein-described process of obtaining strong sulphureted hydrogen, consisting in first treating sulphide of ammonium with dilute carbonic acid and permitting the gases evolved to escape, and then subjecting the sulphide of ammonium to a second treatment of carbonic acid and retaining the sulphureted hydrogen gases evolved, substantially as and for the purposes set forth.

2. The herein-described process of obtaining strong and pure sulphureted hydrogen, consisting in treating sulphide of ammonium with dilute carbonic acid and permitting the gases evolved to escape, and then treating the sulphide of ammonium with strong or pure carbonic acid and retaining the sulphureted hydrogen evolved, substantially as and for the purposes set forth.

In testimony whereof we, the said EDWARD WILLIAM PARNELL and JAMES SIMPSON, have hereunto set our hands.

EDWARD WILLIAM PARNELL.
 JAMES SIMPSON.

Witnesses:
 WILLIAM JOSEPH ROBINSON,
 WILLIAM LOCKWOOD, Jr.